C. VAN HAAGEN.
Grooving Tool.
No. 110,407.                    Patented Dec. 20, 1870.
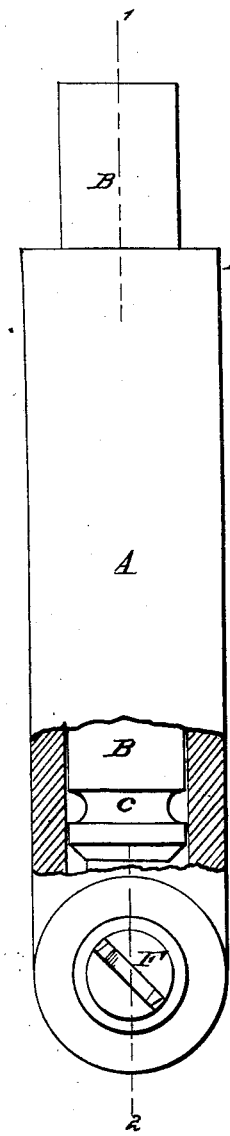
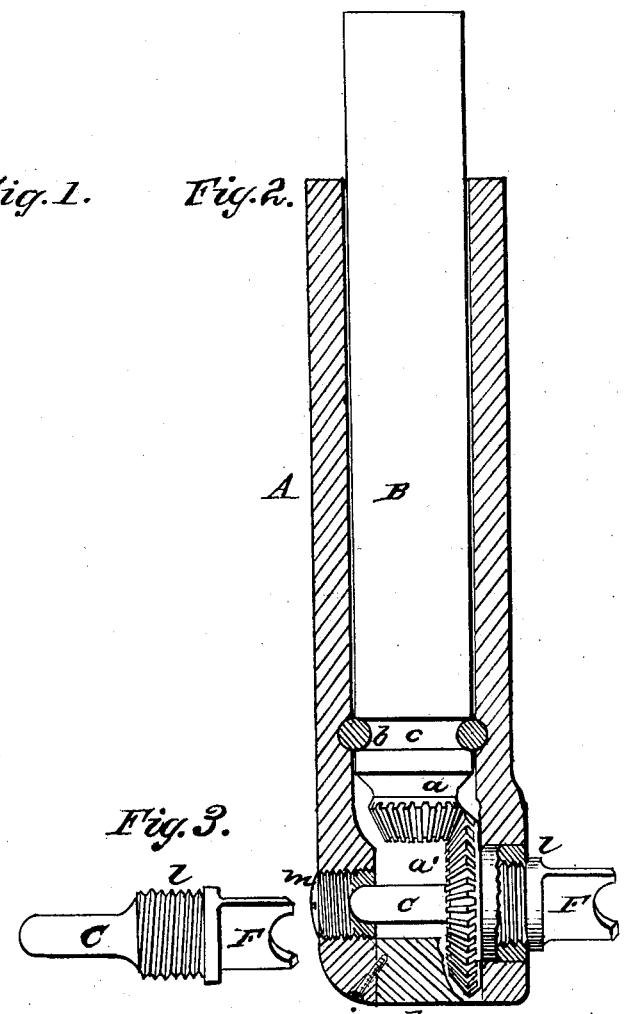
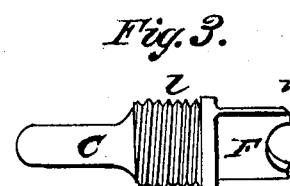

UNITED STATES PATENT OFFICE.

CLAUS VAN HAAGEN, OF PHILADELPHIA, PENNSYLVANIA, ASSIGNOR TO HIMSELF AND ANTHONY VAN HAAGEN, OF SAME PLACE.

IMPROVEMENT IN GROOVING-TOOLS.

Specification forming part of Letters Patent No. 110,407, dated December 20, 1870.

*To all whom it may concern:*

Be it known that I, CLAUS VAN HAAGEN, of Philadelphia, county of Philadelphia, State of Pennsylvania, have invented an Improved Grooving-Tool, of which the following is a specification.

My invention consists of a tool, too fully described hereinafter to need preliminary explanation, for cutting grooves in objects—such, for instance, as key-seats in wheels, &c.—and for cutting spiral grooves.

In the accompanying drawings, Figure 1 is an exterior view, partly in section, of my improved grooving-tool; Fig. 2, a sectional view of the same on the line 1 2, Fig. 1; and Fig. 3, a detached view of the cutter.

A is a tubular stock, attached to any suitable machine in which a sliding movement can be given to it, and in this stock is caused to revolve a spindle, B, provided at its lower end with a bevel-wheel, $a$, which gears into a larger bevel-wheel, $a'$, on a transverse spindle, C, to which the cutter F is secured, or of which the said cutter forms a part.

In fitting the several parts together the bevel-wheel $a'$ of the spindle C is first introduced into the stock through an opening in the end of the same, the said opening being covered by a plate, $h$, which can be readily removed on withdrawing a screw or screws, $i$. After thus introducing the bevel-wheel $a'$ the end of the spindle C is passed through the same from the front of the stock and the threaded portion $l$ of the cutter is screwed into the hub of the wheel. The hub of the bevel-wheel $a'$ turns in an opening in the front of the stock, and the rear end of the cutter-spindle C in a stud, $m$, screwed into the rear of the stock.

The spindle B, with its bevel-wheel, is introduced into the tubular stock from the bottom of the same, and is held in a proper position, but not in such a manner as to interfere with its free motion, by pins $b\ b$, driven through holes in the stock and adapted to a groove, $c$, cut in the spindle.

In using the above-described mechanism a rotary motion is imparted to the spindle B, and consequently to the cutter F. At the same time the stock A is caused to slide, the cutter thus grooving any object which may be presented to its action. The key-seat of a wheel or pulley, for instance, may be formed, the tool passing through the eye, while the revolving cutter forms the desired seat for the key.

The method of arranging the spindle C within the tool-holder and of adapting it to the wheel $a'$ forms an important feature of my invention, as the said spindle can be readily detached from the wheel and as readily replaced by another spindle, to which a cutter, F, of a different size or shape is secured, or of which it forms a part.

Although I prefer that the spindle should be screwed into the wheel $a'$, it will be evident that it may be squared and driven into the same, or be otherwise arranged, so as to prevent any independent motion of the said wheel or slipping of the tool. The other portions of the mechanism are also arranged in such a manner that they can be readily removed from the stock when it becomes necessary to clean or repair them.

A spiral groove can be cut by the tool if the stock A is caused to turn as it slides.

I claim—

The combination herein described, with the stock A, of the spindle B, gears $a\ a'$, tool-spindle C, and the stud $m$, or its equivalent.

In testimony whereof I have signed my name to this specification in the presence of two subscribing witnesses.

C. VAN HAAGEN.

Witnesses:
WM. A. STEEL,
JNO. B. HARDING.